Figure 1:
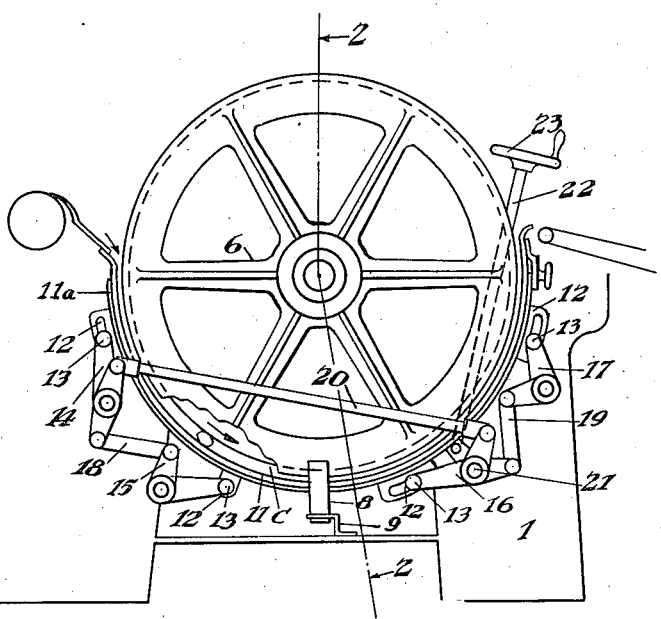

Feb. 14, 1939.　　　E. W. PLAMBECK　　　2,146,846

DOUGH MOLDER

Filed May 4, 1938

INVENTOR
EMIL W. PLAMBECK
BY
George B. Willcox
ATTORNEY

Patented Feb. 14, 1939

2,146,846

UNITED STATES PATENT OFFICE 2,146,846

DOUGH MOLDER

Emil W. Plambeck, Saginaw, Mich., assignor to Baker Perkins Company, Inc., Saginaw, Mich., a corporation of New York Application May 4, 1938, Serial No. 205,954

2 Claims. (Cl. 107—9)

This invention relates to dough molders having opposed co-operative molding surfaces, one a traveling surface, either of the endless flat band or drum type, and the other stationary. In this specification the invention is described and shown as applied to a molder comprising a rotary drum having its peripheral surface approximately concentric with and spaced from the face of a stationary adjustable mold board, operating to compact and shape coiled sheets of dough into loaves or rolls ready for baking.

To adapt the molders of this general kind heretofore employed in the baking art to mold dough pieces of various weights and shapes, it has been necessary to provide means for adjusting or altering both the width and depth of the molding channel bounded by the surfaces of the molding drum, the mold board, and the circumferential flanges defining and closing the edges of the channel. In order to accommodate adjustment of the machine to dough pieces of different diameters it has been necessary to provide circumferential flanges of a height equal to or exceeding the diameter of the largest loaf to be handled. These may range from small finger rolls to large pullman loaves of bread weighing upwards of four or five pounds. In all of the machines heretofore employed the mold board or pressure plate has been mounted between the opposing inner faces of the flanges at the edges of the molding channel, forming a snugly closed channel, which has been considered necessary to prevent dough from being squeezed or pinched out of the channels during the mold operations.

This construction permitted varying the diameters of dough pieces by moving the flexible arcuate mold board toward or away from the face of the drum. In order to alter the length of the dough pieces, however, it was necessary to provide interchangeable mold boards of different widths, one for each length to be produced. In changing these machines from the production of loaves of one given length to another it was therefore necessary to remove the mold board and replace it with another of the appropriate width.

The principal object of this invention is to provide a molding machine of novel construction in which a single adjustable mold board permanently in place serves for molding dough pieces of all lengths and diameters, from the smallest roll to the largest and longest loaf extending the full width of the molding drum.

A further object of the invention is to provide a dough molder assembly in which the radially adjustable mold board, usually covered with fabric, is at no place in close-running relation to a moving surface of the machine, so that it is subjected to no mechanical abrasion to shorten its working life.

In the earlier machines referred to, in which the mold board and the moving flanges were closely fitted, any slight warping of the flexible mold surface, mechanical inaccuracies, or looseness or play in the journals produced rapid wear and cutting of the mold board. Replacement of worn mold boards has been a relatively large item in the cost of operating drum type molders. The relatively frequent shut-downs for changing the mold boards to mold different products have, however, been even more expensive for modern automatic bakeries in which the entire breadmaking process is continuous from mixer to wrapping machine.

The invention by which I have attained the foregoing objects consists in a combination of novel co-operating elements including a single mold board which may remain constantly in place and serve for the molding of dough pieces of every size within the capacity of the molder, and furthermore provides a molding machine in which there is no relative movement between the stationary mold board and the flanges constituting the side walls of the molding channel, and no tendency whatever for dough pieces to be extruded or pinched between the flanges and the mold board. Other advantages and features of the invention will be apparent in the course of the following description.

Figure 2:
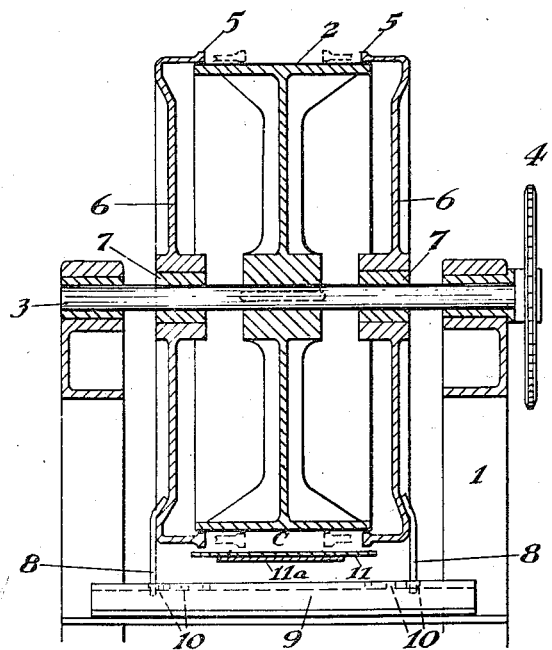
Figure 3:
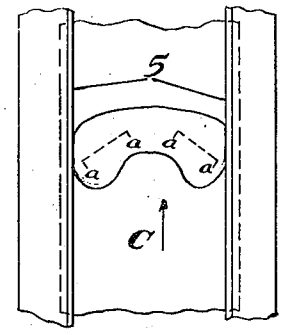
Figure 4:
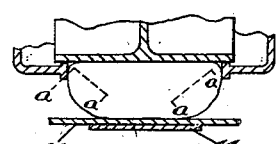

In the accompanying drawing, forming a part of this specification, and in which like numerals designate like parts throughout the same, Fig. 1 is a diagrammatic side elevation, partly broken away, showing a molding machine embodying the invention, Fig. 2 is a vertical cross section of the machine, taken along lines 2—2 of Fig. 1, Fig. 3 is a fragmentary view of the periphery of the molding drum with the mold board removed to show diagrammatically the action of a dough piece in the molding channel, and Fig. 4 is a fragmentary cross section through the molding passage of the machine, as at the bottom of the drum in Fig. 2, showing the machine set for molding a loaf of large diameter.

The invention is shown as applied to a drum-type molder of conventional construction, illustrated diagrammatically and omitting those details which do not affect the construction or operation of the instant improvements. Referring to Figs. 1 and 2, the molder consists of a machine frame or base 1, in which a molding drum 2 of known form is rotatably mounted. Drum 2 is keyed upon a shaft 3 which is journaled in frame 1 in known manner. The molding drum is driven through gear 4 fixed to shaft 3, from appropriate motor-driven gearing, not shown. An arcuate molding channel C extending part way around the peripheral face of the drum is defined by a pair of spaced circumferential flanges 5. The invention consists in part of a novel construction and arrangement of the flanges 5 relative to the drum. Each flange 5 is mounted concentrically with the molding drum and is suitably held against rotation. In the drawings the flanges 5 are shown mounted each upon a spider or wheel 6 carried upon axial sleeves or bushings 7. Bushings 7 are slidably mounted endwise upon shaft 3, fitted and lubricated so that the shaft can rotate freely within them.

The flanges 5 and wheels 6 are held against rotation with the shaft by appropriate means. A simple device for this purpose is shown, consisting of a pair of fingers 8 fixed to and projecting downward from the flanges 5. Each finger consists simply of a metal strip bolted or welded to a wheel 6. A transverse stop member 9, consisting of a reverse-angle strip of metal is secured to the machine base. Its upper flange is directed counter to the direction of rotation of the molding drum and presents a plurality of spaced notches 10 in its edge. The fingers 8 of each flange are received by the notches 10 and abut against the bar 9. Thus rotation of the flanges in response to friction of the rotating shaft 3 with bushings 7 is prevented and they are held stationary during operation of the machine. The flanges 5, wheels 6, and bushings 7 are adjustable along shaft 3 toward and away from each other to define molding channels of various widths, as is indicated by dotted lines in Fig. 2. This adjustment is very simply and easily made by rocking the flanges clockwise in Fig. 1 to disengage the fingers 8 from the notches 10, then sliding the wheels 6 along shaft 3 until each finger 8 engages another desired notch 10 in the stop bar 9. The flanges 5 are thus held positively against rotation and accidental shifting transversely of the molding surface.

The drum and stationary flanges described form and define three sides of the molding channel C in the drawing. The fourth side is formed by an adjustable mold board, the arrangement of which constitutes an important feature of the invention. The pressure plate or mold board 11 of the improved apparatus is of known construction, consisting of a flexible strip of sheet metal curved to arcuate or semi-cylindrical form, and faced with canvas or other frictional surfacing material, not shown.

A backing plate 11a carries the necessary attachment lugs for adjustably mounting the mold board in spaced relation to the face of the molding drum, as shown in Fig. 1. Suitable means is provided for curving the pressure plate 11 to a smaller or larger radius toward or away from the molding drum so that dough pieces of desired different diameters may be molded. For example, spaced lugs 12 having slotted openings fixed to the backing plate 11a are pivotally and slidably engaged and supported by pins 13 mounted on the machine frame 1. Pins 13 are adjustable radially to and away from the molding drum, and are preferably linked together for simultaneous movement so that a single operation changes the curvature of the molding board throughout its length while maintaining its desired relationship to the face of the drum. In the machine shown this adjustment of the pressure plate is accomplished by mounting the pins 13 upon bell-cranks or levers 14, 15, 16, 17 pivoted to the machine frame. Cranks 14 and 15 are linked by a connecting rod 18, and cranks 16 and 17 are operatively joined by a link 19. Cranks 14 and 16 are connected by a rod 20. Bell-crank 16 is rocked about its axis 21 by a screw 22, indicated diagrammatically by dotted lines, and provided with a hand wheel 23.

When bell-crank 16 is rocked clockwise in Fig. 1, the interconnected bell-cranks 14, 15, 16, 17 are simultaneously actuated to move all of the pins 13 inward toward the axis of the molding drum. This action bends or curves the mold board 11 uniformly closer to the drum 2, to mold dough pieces of smaller diameter. Adjustment of bell-crank 16 counter-clockwise draws the mold board 11 further away from the drum, so that large loaves may be molded.

An important feature of the invention is the form and location of mold board 11 with relation to the molding drum and the stationary flanges 5. The flanges differ from those heretofore employed in machines of this kind in that they are very low or shallow. The mold board 11 extends the full width of the molding drum and is positioned outside of the flanges so that it faces them, instead of engaging them edgewise as in previous machines. Since the mold board 11 is outside of the flanges, the height of the flanges radially of the drum should not exceed the diameter of the smallest dough piece to be molded, such as a finger roll. However, because of the novel arrangement of the molding elements, the flanges need not be more than one-fourth or one-half inch deep for satisfactory operation of the machine. The inner edges of the flanges are machined concentric with the axis for a close running fit with the periphery of the drum.

When the mold board 11 is adjusted to handle loaves of maximum diameter, as in Fig. 4, the sides of the molding channel are virtually open. A notable feature of the invention is that this virtually open-sided molding channel may be employed without any tendency whatever for dough pieces to be squeezed between the flanges and pressure plate out of the channel.

I have discovered that in dough molders of this kind dough tends to be drawn out of the molding channel only between two relatively moving surfaces. In the case of machines having flanges revolving with the drum, dough tended to be squeezed out and pinched from the pieces between the flanges and the stationary mold board. Because of this tendency it was necessary to maintain a close running fit between the edges of the adjustable, flexible mold board and the flanges, necessarily resulting in friction and rapid wear of the mold board.

In the light of this discovery the present invention was developed, in which the relative movement takes place between flanges and the drum. The surfaces here are of rigid metal, are easily machined truly circular, and the flanges are positively and permanently centered upon the axis of the drum. Thus a close enough fit to prevent the entrance of dough between the flanges and drum surface may be had and kept without undue friction and continuing wear. Similarly in flat-type molders, low straight-bottomed side rails for the molding surface may be adjusted and held close to the endless belt traveling over a plane metal bed without undue friction and wear of the face of the belt.

The molder described is operated in the usual manner of machines of this kind. Coiled sheets of dough are delivered from sheeting and curling rolls, not shown, into the molding channel, at the left in Fig. 1. They are carried by the drum between its surface and the stationary pressure plate 11, being shaped and compacted the while, to the end of the pressure plate at the right in Fig. 1, whence they are discharged onto a conveyor for panning.

Figs. 3 and 4 show diagrammatically the action of a dough piece in the molding channel of the invention, whereby a dough piece as might be expected, is not squeezed from between the mold board 11 and the low flanges. Fig. 3 shows the form taken by the dough piece, compressed by adjusting the pressure plate closer to the drum than is normal for a piece of its size and length. The dough piece is flattened to present an elliptical cross-section. As the flattened dough piece is rolled along the mold-board by the rotating drum there is also a tendency for it to be squeezed outwardly against the stationary flanges 5. Because the dough piece is moving, its engagement with the stationary flanges causes its ends to be retarded with respect to its mid-portion so that a certain amount of dough is drawn from its center to its ends, producing the dumb-bell-shaped piece shown. The piece travels through the channel of its discharge point in this shape, the mid-portion rotating about an axis transverse of the channel and its ends rotating about rearwardly directed axes, indicated by dotted lines a—a. If the pressure plate is adjusted still closer to the drum the dumb-bell shape of the dough piece will be further exaggerated, but no dough will be squeezed over the flanges.

Fig. 4 illustrates the normal shape of a dough piece in the molding channel. Its frictional engagement with the stationary flanges and the adjacent moving surface of the drum produces a rotation of the ends of the dough piece about axes inclined toward the angle presented by the flanges and drum surface, indicated also by dotted lines a—a. There is a tendency for the compressed dough to be drawn and pressed into the space between the flanges and the drum, but a close running fit is easily maintained at this point so that no dough will actually enter the clearance and be pinched off from the dough piece. Because of the tendency of the ends of a dough piece to be drawn rearwardly as shown in Fig. 3, and inwardly toward the drum as shown in Fig. 4, the ends of the dough piece and adjacent the mold board 11, which might be expected to bulge outwardly over the flanges, are continually rolled inwardly toward the center of the drum. Experimentation has revealed that a flange as low as one-fourth inch deep is adequate to confine a loaf to the molding channel, regardless of the diameter to which it is being molded.

Because of the action described, it is possible in machines according to the invention to employ side flanges of very limited height, contrary to the hitherto-held opinion of men skilled in the molding machine art. These low flanges in turn make possible the use of a single mold board 11 extending the full width of the drum positioned exteriorly of the flanges. With a machine so constructed dough pieces can be molded to any desired length by adjusting the flanges inwardly or outwardly as in Fig. 2, and to any desired diameter down to the height of the flanges by simply adjusting the one mold board toward or away from the drum.

While I have shown and described a particular form of machine, this is to be taken as illustrative of the invention only. Various modifications and changes in structural detail may be made without departing from the invention. The invention is equally applicable to flat belt-type molders.

Having thus described my invention, what I claim is:

1. In a dough molder, in combination, a rotary drum presenting a peripheral molding surface, a pair of stationary annular flanges concentric with said drum and adjustable toward and from each other to define a molding channel of variable width extending circumferentially of said drum, said flanges being no deeper than the diameter of the smallest dough piece to be molded, and a stationary arcuate mold-board equal in width to the maximum adjusted spacing between said flanges positioned exteriorly of said flanges in spaced relation to said drum, and means for adjusting said mold-board radially toward and away from the molding surface of said drum for molding dough pieces of different diameters.

2. In a dough molder, in combination, a traveling molding element presenting a molding surface, a pair of stationary spaced side members close to said surface and adjustable toward and from each other to define the lateral limits of a molding channel of variable width extending lengthwise of said traveling molding surface, said side members being no deeper than the diameter of the smallest dough piece to be molded, and a stationary mold-board equal in width to the maximum adjusted spacing between said side members positioned exteriorly of said side members in spaced relation to said molding surface, and means for adjusting said mold board toward and away from said molding surface for molding dough pieces of different diameters.

EMIL W. PLAMBECK.